United States Patent [19]
Ha

[11] Patent Number: 5,443,423
[45] Date of Patent: Aug. 22, 1995

[54] VARIABLE BOLT PIN CHAIN BELT TRANSMISSION SYSTEM

[76] Inventor: Jin S. Ha, 17578 Tuscan Dr., Granada Hills, Calif. 91344

[21] Appl. No.: 317,640

[22] Filed: Oct. 3, 1994

[51] Int. Cl.⁶ .............................................. F16H 55/00
[52] U.S. Cl. .......................................... 474/47; 474/49
[58] Field of Search .................................. 474/47–50, 474/52–56

[56] References Cited

U.S. PATENT DOCUMENTS

| | | | |
|---|---|---|---|
| 3,604,282 | 9/1971 | Shambaugh et al. | 474/47 |
| 4,591,351 | 5/1986 | Kumm | 474/49 |
| 4,714,452 | 12/1987 | Kumm et al. | 474/49 |

*Primary Examiner*—Michael Powell Buiz
*Attorney, Agent, or Firm*—Birch, Stewart, Kolasch & Birch

[57] ABSTRACT

A variable bolt pin chain belt transmission for use in a vehicle, includes a pair of variable bolt pin pulleys having a plurality of bolt pins which are lined in a plurality of circles, a chain belt engaging with both variable bolt pin pulleys. Different sized pulleys are formed by pushing and pulling the bolt pins in and out of engagement with the belt by different formed solenoids, whereby upon the selection of the gear selector, the plurality of bolt pins form different relative sized pulleys for the wheel in the forward or reverse direction at different pulley ratios.

6 Claims, 3 Drawing Sheets

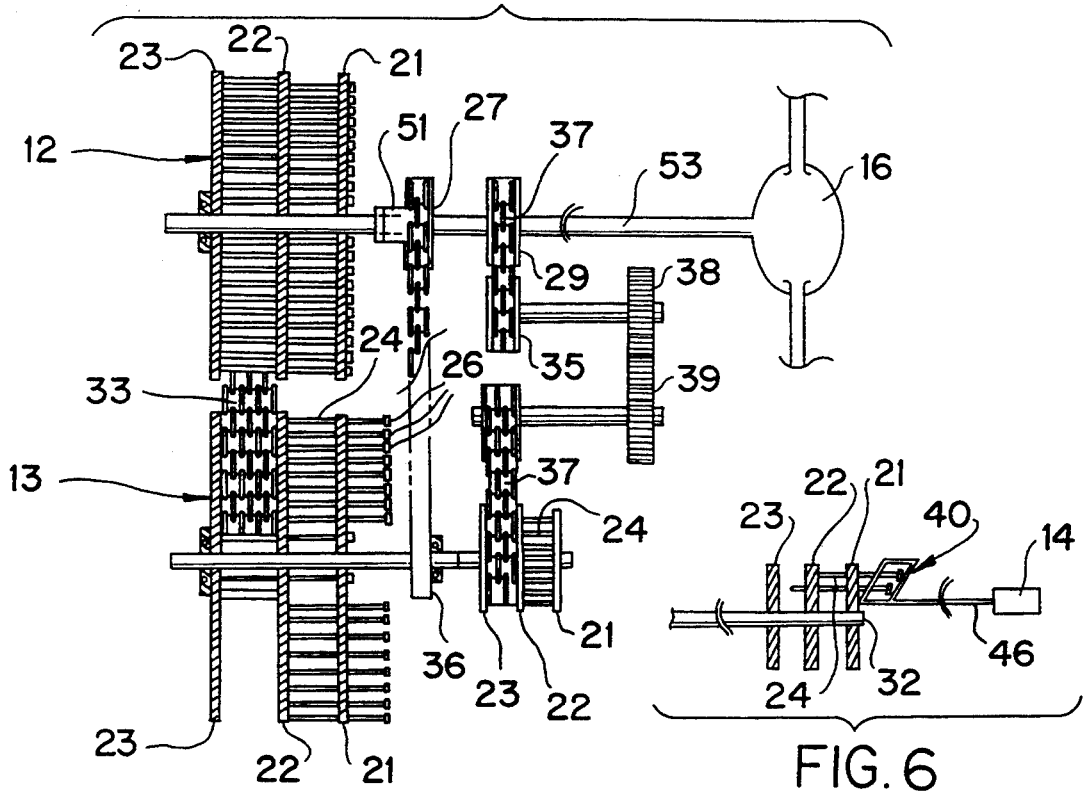
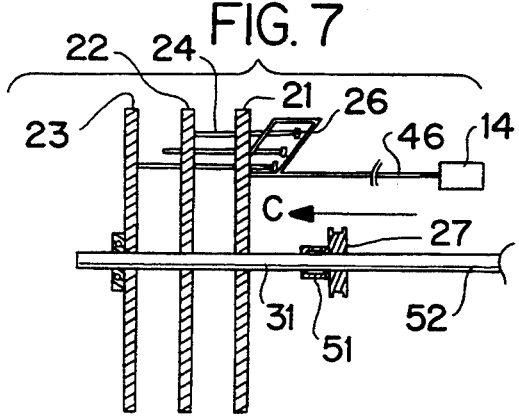
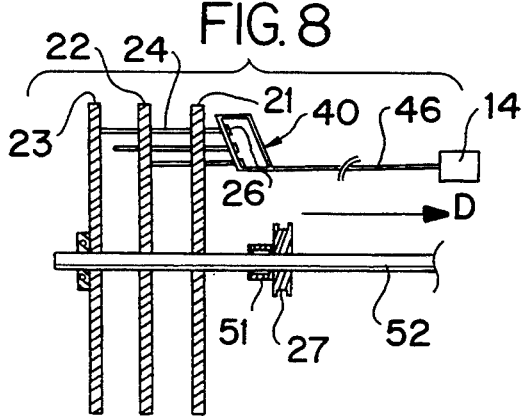

VARIABLE BOLT PIN CHAIN BELT TRANSMISSION SYSTEM

BACKGROUND OF THE INVENTION

1. Field of the Invention

The present invention relates to a variable bolt pin chain belt automatic transmission system for automobiles. More particularly, to an automatic transmission system which is structured with a pair of variable bolt pin pulleys having a plurality of bolt pins and a chain belt engaged with both variable bolt pin pulleys for providing smoother automobile performance and improving fuel economy.

2. Description of Related Art

There are many types of automatic transmissions which are well known in the art which utilize a torque converter for use in the automatic transmission. However, these automatic transmissions suffer from a number of disadvantages such as, for example, they are required to exhaust a large amount of gasoline for operating a hydraulic oil pressure system connected to the torque converter during shifting between gear range positions such as shifting from first gear to second gear, from second gear to third gear, from third gear to first gear, or from "P" park to "R" reverse. Furthermore, it is difficult to install or assemble such conventional transmission systems since they have a very complicated structure.

Other types of conventional transmissions include a pair of variable diameter cone shaped pulleys and a belt which form a continuously variable transmission. However, these transmissions require a hydraulic oil pressure system, and have a short life time.

SUMMARY OF THE INVENTION

Accordingly, it is an object of the present invention to provide an improved belt-type vehicle automatic transmission system for saving gasoline, which eliminates the above problems encountered with conventional automatic transmissions for automobiles.

Another object of the present invention is to provide a variable bolt pin chain belt automatic transmission including a first variable bolt pin pulley and a second variable bolt pin pulley, a chain belt engaged with the relatively changeable first and second variable bolt pin pulleys, and guide members for driving and reversing the bolt pins, whereby the engine power can be effectively transmitted to the axles.

A further object of the present invention is to provide an automatic transmission system which does not require the use of a hydraulic oil pressure system as a basic component thereof.

Still another object of the present invention is to provide a variable bolt pin chain belt automobile transmission system which is simple in structure, compact for portability, inexpensive to manufacture, durable in use, and contributes to improved fuel economy.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 5 is a sectional view of the plurality of bolt pins according to the present invention showing the chain belt engaged with a forming largest variable bolt pin pulley and a forming smallest variable bolt pin pulley of the preset invention;

FIG. 6 is a sectional view of one circle of a variable bolt pin pulley according to the present invention showing the reverse position of the shift lever of the present invention;

FIG. 7 is a sectional view of the guide member according to the present invention showing pushing three bolt pins to the variable bolt pin pulley in order to form a larger forming bolt pin pulley of the present invention; and FIG. 8 is a sectional view of the guide member according to the present invention showing pulling three bolt pins from the variable bolt pin pulley in order to form a smaller forming bolt pin pulley of the present invention.

DESCRIPTION OF THE PREFERRED EMBODIMENTS

Figure 1:
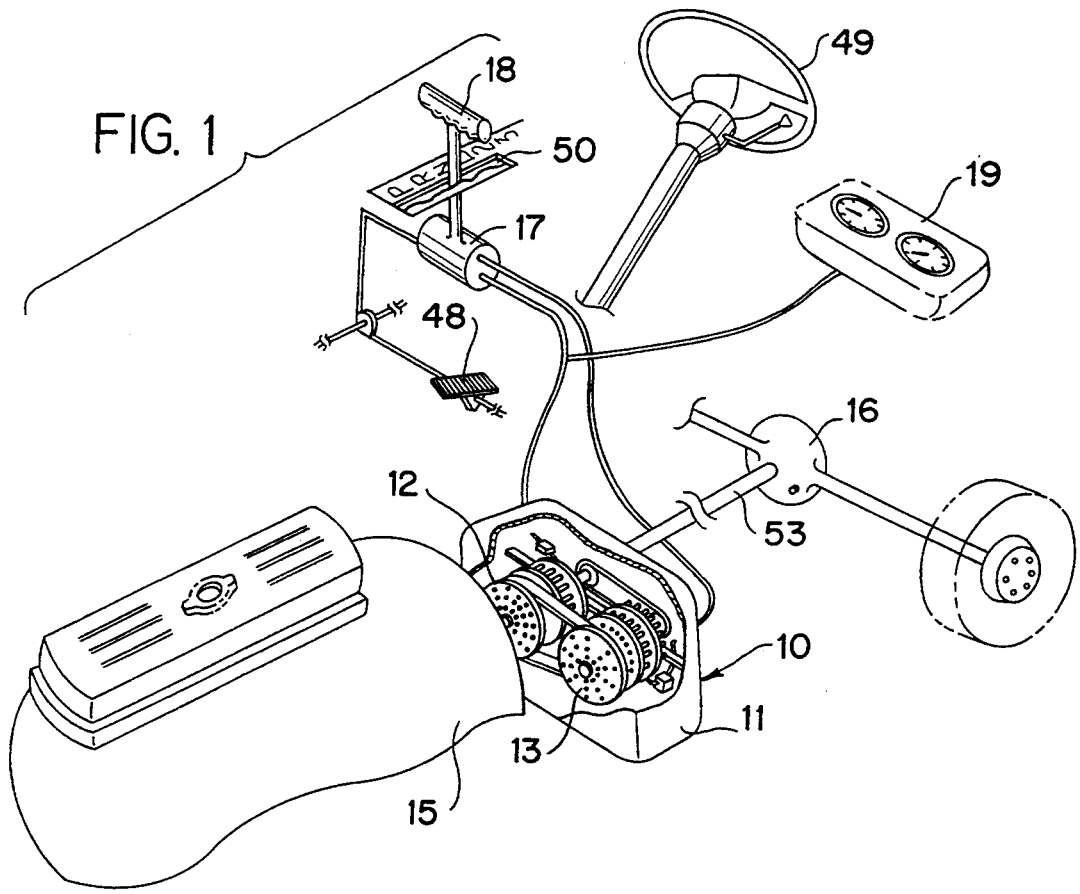
FIG. 1 is a perspective view of a variable bolt pin chain belt automatic transmission system showing the basic components according to the present invention containing cut-away portions in order to illustrate the construction of the apparatus of the present invention.

Referring now in detail to the drawings for the purpose of illustrating preferred embodiments of the present invention, the variable bolt pin chain belt automatic transmission system as shown in FIGS. 1, 2, 3, and 4 comprises a variable bolt pin pulley member 10 including first and second variable bolt pin pulleys 12 and 13, solenoids 14 disposed within a variable bolt pin pulley housing 11, an engine 15 and an axle 16 both connected to the variable bolt pin pulley member 10, a gear selector 17 with a shift lever 18 connected to the variable bolt pin pulley member 10, and a speedometer 19 connected to the variable bolt pin pulley member 10.

Figure 2:
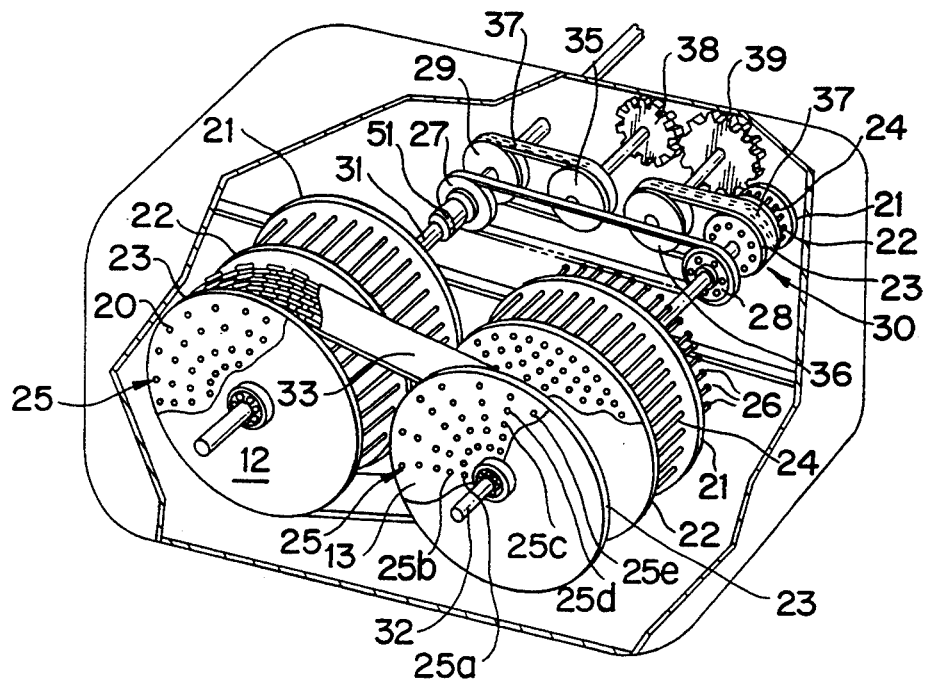
FIG. 2 is a perspective view of a pair of variable bolt pin pulleys of the variable bolt pin chain belt automatic transmission system according to the present invention containing cut-away portions in order to illustrate the construction of the apparatus of the present invention.

The first and second variable bolt pin pulleys 12 and 13 of the variable bolt pin pulley member 10 contain a plurality of bolt pins 24 each provided with a bolt head 26, which can smoothly move in first, second, and third disks 21, 22, and 23, respectively. The first, second, and third disks 21, 22, and 23 have a plurality of apertures 20 disposed therein and these apertures 20 form gradually larger radial circles in the disks 21, 22, and 23. In FIG. 2, there are at least 5 circles 25a, 25b, 25c, 25d, 25e. The number of circles 25 can be more or less than 5 if necessary.

The second gear pulley 13 is coaxially connected to the second sprocket 28 by the second shaft 32. The shaft 31 is connected to an end shaft 52 through a bearing 51 and power from the first shaft 31 does not transfer to the end shaft 52. The first sprocket 27 has a one-way clutch (not shown) between the first sprocket 27 and the end shaft 52. The first sprocket 27 is connected to the second sprocket 28 by an auxiliary chain belt 34.

A main chain belt 33 engages the first and second variable bolt pin pulleys 12 and 13. Also, the third sprocket 29 and circle pulley 30 are in driving relationship with fourth and fifth sprockets 35 and 36 through chains 37, respectively. The fourth and fifth sprockets 35 and 36 are coaxially connected to first and second gears 38 and 39, respectively, and the first gear 38 is in gearing relationship with the second gear 39. The circle pulley 30 is connected to the solenoid 14b for actuating circle pulley 30 when a shift lever 18 of the gear selector 17 is in the "R" reverse position.

Figure 3:
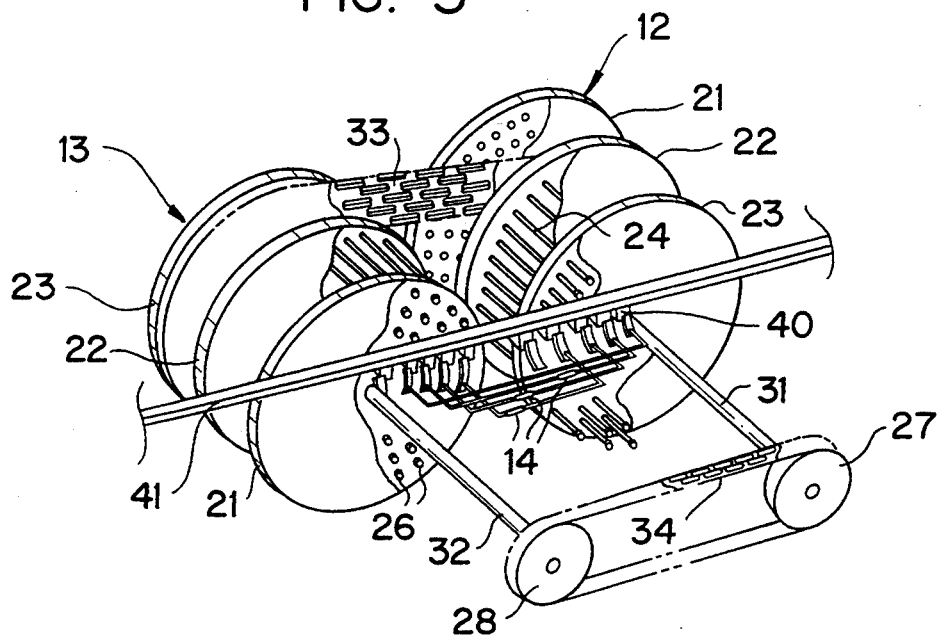
FIG. 3 is a perspective view of the pair of variable bolt pin pulleys of the variable bolt pin chain belt automatic transmission system according to the present invention containing cut-away portions in order to illustrate a plurality of bolt pins and guide members of the apparatus of the present invention.
Figure 4:
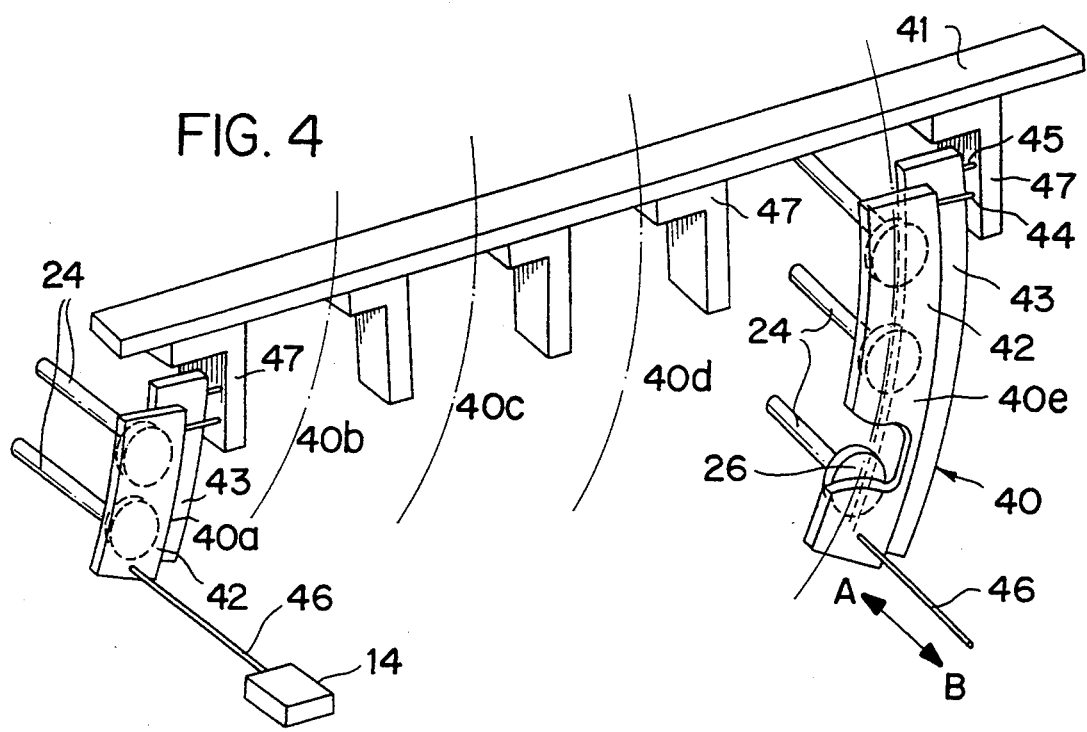
FIG. 4 is a perspective view of a horizontal guide bar connecting with the plurality of guide members of the variable bolt pin chain belt automatic transmission system according to the present invention.

As shown in FIGS. 3 and 4, a guide bar 41 having guide members 40a, 40b, 40c, 40d, and 40e from inside to outside. The guide bar is fixed to the gear pulley housing 11 at each end. The guide members (40a, 40b, 40c, 40d, and 40e) are disposed adjacent to the first disks 21, 23 of the first and second variable bolt pin pulleys 11 and 12 for effectively pushing and pulling the plurality of pin heads 26 of bolt pins 24 so as to form first and second different size bolt pin pulleys disposed in the first and second variable bolt pin pulleys 12 and 13.

As shown in FIG. 4, the guide member 40 defines an upper plate 42 and a lower plate 43 attached to the upper plate 42 at inside portions thereof for mating with the pin heads 26 of the bolt pins 24 at remaining outside portions thereof. Each guide member 40 pivotally attaches to each support 47 extending from the horizontal guide bar 41 by pivotal pins 44 and 45 at an upper portion thereof. At a lower portion of each guide member 40, there is a rod 46 connected to a solenoid 14a for automatically pushing and pulling the rod 46 in the direction indicated by arrows (A) and (B) shown in FIG. 4.

The variable bolt pin chain belt automatic transmission 10 according to the present invention operates as follows. As shown in FIGS. 1 and 5, when the shift lever 18 moves to the "D" drive position, the main chain belt 33 engages with the largest forming bolt pin pulley 25e of the first variable bolt pin pulley 12 and the smallest forming bolt pin pulley 25a of the second variable bolt pin pulley 13 (FIGS. 2 and 5).

As shown in FIGS. 1, 2, and 4, when the driver pushes the accelerator pedal 48 and the speedometer 19 indicates one stage such as a 15 km indication, the solenoid 14a activates to pull the rod 46 connected to the guide member 40e for pulling three bolt pins 24 disposed in the circle 25e. In other words, the forming bolt pin pulley of the circle 25e of the first pulley 12 and simultaneously to push the rod 46 associated with the 25b circle for pushing three bolt pins 24 disposed in the circle 25b of the second variable bolt pin pulley 13.

Thereafter, the chain belt 33 engages with the forming variable bolt pin 25d of the first variable bolt pin pulley 12 and the forming bolt pin pulley 25b of the second variable bolt pin pulley 13 to establish a second transmission ratio. Such as the above situation, the chain belt 33 then engages with the forming bolt pin pulley 25c of the first variable bolt pin pulley 12 and the forming bolt pin pulley 25c of the second variable bolt pin pulley 13 to establish a third transmission ratio. Also, the chain belt 33 engages with the forming bolt pin pulley 25b of the first variable bolt pin pulley 12 and the forming bolt pin pulley 25d of the second variable bolt pin pulley 13 to establish a fourth transmission ratio. The chain belt 33 engages with the forming bolt pin pulley 25a of the first variable bolt pin pulley 12 and the forming bolt pin pulley 25e of the second variable bolt pin pulley 13 to establish a fifth transmission ratio (FIG. 3).

Accordingly, when the shift lever 18 stays on the "D" drive position of a shift box 50 and the first and second variable bolt pin pulleys 12 and 13 rotate, the power from the engine 15 transfers to the shaft 32 of the second gear pulley 13 by the main chain belt 33. And then the power from the shaft 32 transfers to the shaft 52 by the auxiliary chain belt 34 of the first and second sprockets 27 and 28. Thereafter the power transfers to the axle 53 through a differential 16 and to the wheels (FIG. 1). The numeral 49 represents the steering wheel (FIG. 1).

The operation of the guide members 40 for moving the bolt pins 24 into and out of engagement with the third disk 23 and thereby forming larger and smaller bolt pin pulleys will be described with reference to FIGS. 7 and 8.

As shown in FIG. 7, the solenoid 14a activates to push the rod 46 and push the pin heads 26 of the bolt pins 24 in the direction indicated by arrow (c) shown in FIG. 7. Subsequently, the bolt pins 24 consecutively rotate into engagement with the guide member 40 which guides the bolt pins 24 into the space disposed between the second and third disks 22 and 23. Therefore, the chain belt 33 engages with the larger forming bolt pin pulley gradually.

As shown in FIG. 8, the solenoid 14a actuates to pull the rod 46 and pull the pin heads 26 of the bolt pins 24 in a direction indicated by arrow D. Subsequently, the bolt pins 24 consecutively rotate into engagement with the guide member 40 which guides the bolt pins 24 out of the space between the second and third disks 22, 23. Therefore, the chain belt 33 gradually engages with a smaller forming bolt pin pulley.

As shown in FIGS. 5 and 6, when the shift lever 18 moves to "R" reverse position of the shift box 50 and the accelerator pedal 48 is pushed by the driver, the solenoid 14b actuates to operate the one circle pulley 30. That is, the guide member 40 pushes the plurality of bolt pins 24. Therefore, the belt 37 is operational with the fifth sprocket 36 and the first gear 38 gears together with the second gear 39 and then the fourth sprocket 35 rotates. Accordingly, the third sprocket 29 rotates in the counterclockwise direction so the automobile moves reversely.

Accordingly, the variable bolt pin chain belt automatic transmission 10 according to the present invention is simple in structure, easy in use and repair, and inexpensive to manufacture.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A variable bolt pin chain belt transmission, comprising:
   a first variable bolt pin pulley and a second variable bolt pin pulley disposed within a housing, each variable bolt pin pulley including first, second, and third disks, and a plurality of bolt pins which are slidably inserted in a plurality of apertures disposed thereon, said apertures being formed in gradually different sized radial circles for forming different sized bolt pin pulleys,
   a main chain belt engaging with said first and second variable bolt pin pulleys, and
   a plurality of guide members connected to drive solenoids for pushing and pulling said plurality of bolt pins for forming said different sized bolt pin pulleys.

2. The variable bolt pin chain belt transmission of claim 1, wherein there are at least five different sized radial circles of said apertures.

3. The variable bolt pin chain belt transmission of claim 1, wherein said plurality of guide members are supported by a guide bar which is fixed to said housing, said guide members including an upper plate and a lower plate attached to said upper plate at inside portions thereof for mating with the bolt pins.

4. The variable bolt pin chain belt transmission of claim 3, wherein said upper and lower plates are pivotally attached to a support extending from the guide bar.

5. The variable bolt pin chain belt transmission of claim 4, wherein each said guide member corresponds to each radial circle of apertures.

6. The variable bolt pin chain belt transmission of claim 4, wherein each of said bolt pins have a pin head which engage with said guide members.

* * * * *